(12) United States Patent
Merkel et al.

(10) Patent No.: US 8,678,466 B2
(45) Date of Patent: Mar. 25, 2014

(54) INSTRUMENT PANEL ASSEMBLY

(75) Inventors: Nicholas Earl Merkel, Canton, MI (US); Todd Miller, Stamping Ground, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/435,153

(22) Filed: Mar. 30, 2012

(65) Prior Publication Data

US 2013/0257086 A1 Oct. 3, 2013

(51) Int. Cl.
*B62D 25/14* (2006.01)
*B23Q 17/00* (2006.01)

(52) U.S. Cl.
USPC .......................................... 296/70; 29/407.09

(58) Field of Classification Search
USPC ................... 296/70, 1.08, 72, 37.12, 193.03, 296/187.05, 24.34, 37.8, 153, 146.1; 248/27.3; 180/90
See application file for complete search history.

(56) References Cited

U.S. PATENT DOCUMENTS

| 6,948,753 | B2 * | 9/2005 | Yoshida et al. | 296/1.08 |
| 7,597,371 | B2 | 10/2009 | Gidcumb, Jr. | |
| 7,753,423 | B2 | 7/2010 | Zellner, Jr. | |
| 7,810,863 | B2 * | 10/2010 | Kamano et al. | 296/70 |
| 7,954,851 | B2 * | 6/2011 | Sato | 280/752 |
| 8,075,034 | B2 * | 12/2011 | Koizumi et al. | 296/24.34 |
| 2003/0015364 | A1 * | 1/2003 | Ritter et al. | 180/90 |

* cited by examiner

*Primary Examiner* — Glenn Dayoan
*Assistant Examiner* — Sunsurraye Westbrook
(74) *Attorney, Agent, or Firm* — Gifford, Krass, Sprinkle, Anderson & Citkowski, P.C.

(57) ABSTRACT

An instrument panel assembly and method of installing an instrument panel assembly is provided. The instrument panel assembly includes a base having a side portion. The side portion includes a first mounting aperture. A side panel is dimensioned to cover the side portion. The side panel is configured to be angled relative to the side portion so as to preventing other tabs from scratching the exterior surface of the instrument panel assembly.

14 Claims, 5 Drawing Sheets

INSTRUMENT PANEL ASSEMBLY

FIELD OF THE INVENTION

The invention relates to an instrument panel assembly for use in an automotive vehicle and a method of assembling an instrument panel assembly. More particularly, the invention relates to an instrument panel assembly having a side panel configured to be angled relative to the base when mounting the side panel to the side portion, and a method of installing the side panel to the instrument panel assembly.

BACKGROUND OF THE INVENTION

Instrument panel assemblies for use in automotive vehicles are known. Instrument panel assemblies typically include a base having a side portion. The side portions are disposed adjacent respective front passenger and driver doors of the vehicle. A side panel is mounted to the side portions of the base. The side panel includes tabs configured to engage mounting apertures of the side portion. However, some tabs may rub up against exterior surfaces of the side portion and thus mar the exterior surface during assembly.

SUMMARY OF THE INVENTION

According to one aspect of the invention an instrument panel assembly for use in an automotive vehicle is provided. The instrument panel assembly includes a base having a side portion. The side portion includes a first mounting aperture having a predetermined width relative to the width of the vehicle.

The instrument panel assembly includes a side panel dimensioned to cover the side portion. The side panel includes an interior surface opposite an exterior surface. A first tab is spaced apart a second tab. The first tab extends axially from a side edge of the side panel. The second tab extends downwardly from the interior surface of the side panel.

The first tab includes a first flange disposed on the exterior surface extending opposite the second tab. The first flange has a length greater in distance than the width of the first mounting aperture. Accordingly, mounting the side panel to the side portion requires the side panel to be angled so as to fit the first flange into the first mounting aperture wherein the side panel is rotated and seated onto the side portion thus preventing other tabs from scratching the exterior surface of the instrument panel assembly.

A method of assembling an instrument panel assembly is also provided. The method includes providing a base having a side portion. The side portion includes a first mounting aperture having a predetermined width. The method includes the step of providing at least one side panel having an interior surface opposite an exterior surface.

The side panel includes a first tab spaced apart a second tab. The first tab extends axially from a side edge of the at least one side panel. The second tab extends outwardly from the interior surface of the side panel. The first tab includes a first flange disposed on the exterior surface. The first flange extends opposite the second tab. The first flange has a length greater in distance than the predetermined width of the first mounting aperture.

The method proceeds to the step of angling the side panel with respect to the side portion so as to fit the first flange into the first mounting aperture and seating the first tab into the first mounting aperture. The method proceeds to the step of rotating the side panel towards the side portion of the base about the first mounting aperture.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE INVENTION

Figure 1:
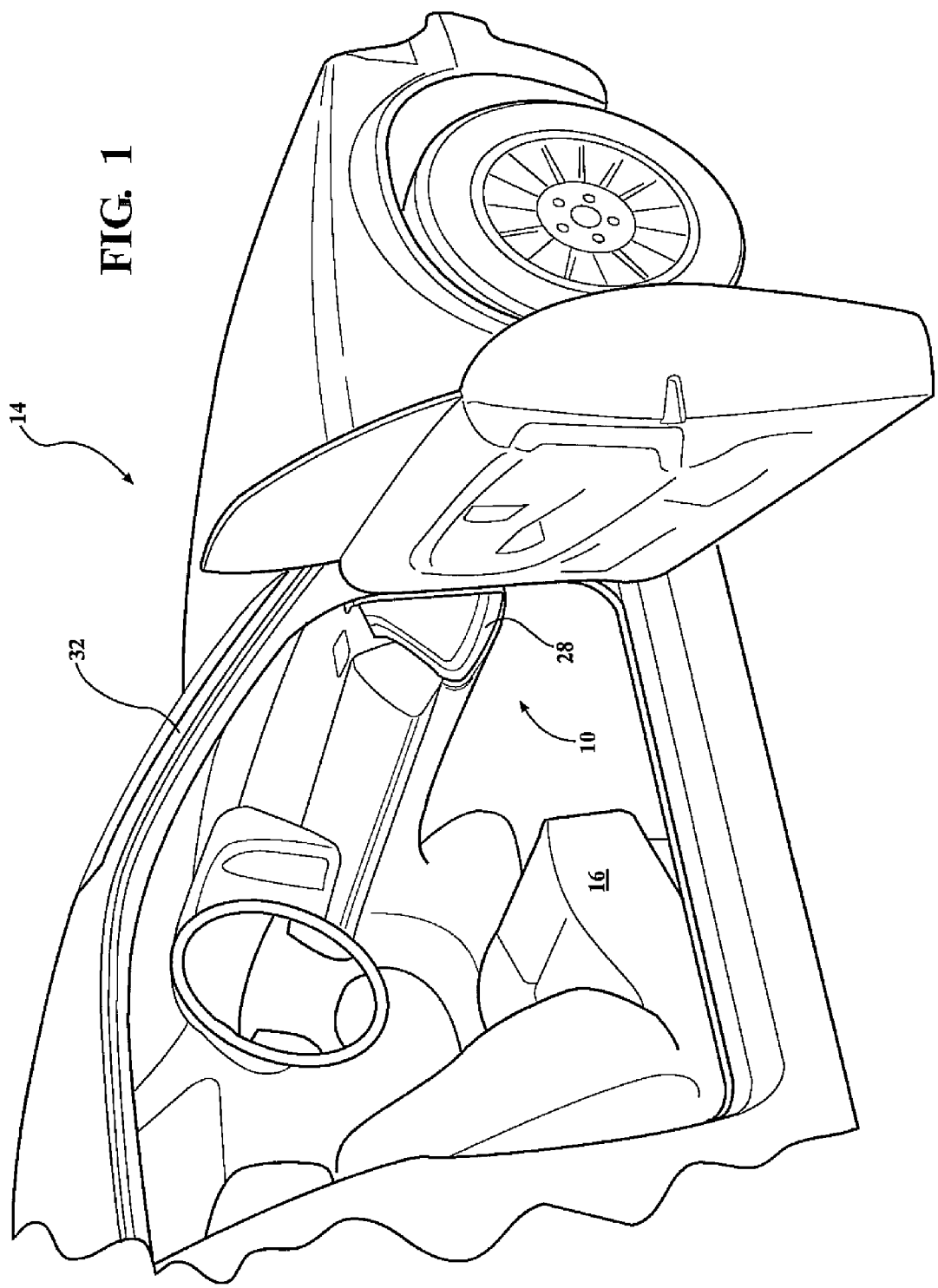
FIG. 1 is a perspective view of the interior of an automotive vehicle showing the instrument panel assembly.

With reference now to FIGS. 1-4, an instrument panel assembly 10 is provided. The instrument panel assembly 10 includes a base 12 extending generally along the width of the automotive vehicle 14 between a driver seat (not shown) and front passenger seat 16. The instrument panel assembly 10 is disposed within the cabin space of the automotive vehicle 14 and may be configured to receive and hold vehicle 14 components such as a radio, or instrument panel displays.

The base 12 includes a side portion 18, a top portion 20, and a front portion 22. The top and front portions 20, 22 generally extend the width of the automotive vehicle 14 and may include compartments configured to receive various components such as an air conditioning duct, or electrical devices and displays. The top portion 20 may be covered with a top portion cover 24 and the front portion 22 may be covered with a front portion cover 26. The top portion 20 and front portion covers 26 may include a skin such as synthetic leather or the like to provide an aesthetically pleasing view to the passengers.

A pair of side panels 28 is mounted to the respective side portions 18 of the base 12. The figures depict a side panel 28 adapted to attach to the side portion 18 of the automotive vehicle 14 adjacent the front passenger seat 16. However, the side panels 28 are generally symmetrical to one another and thus discussion of one is illustrative and exemplary of the other.

The base 12 is mounted to the vehicle body 30 adjacent the A pillar 32 and side frame 34 of the vehicle body 30. The base 12 is mounted thereto using various brackets and fastening devices known to those skilled in the art to include vibrational welding, spot welding, and the like. A portion of the base 12 may further be mounted onto an instrument panel reinforcement bar (not shown) which extends between opposing side frames 34 of the vehicle 14, and sits behind the instrument panel assembly 10. The base 12 is typically formed of a durable and resilient material such as injected molded polymers.

In some instances it is desirable to attach the top portion cover 24 and the front portion cover 26 onto respective top and front portions 20, 22 of the base 12 after the base 12 is mounted onto the vehicle body 30. It may be further desirable to line the front driver and front passenger side openings with a weather strip 36 and apply the side panel 28 on last.

In such cases, the side panel 28 may scratch or mar the outer surface of respective front portion 22 and top portion covers 24 as the path of installation causes protrusions in the side panel 28 to come into contact with the outer surface of respective front portion 22 and top portion covers 24. Accordingly it remains desirable to have an instrument panel assembly 10 wherein the assembly of the side panel 28 is such that the path of installation does not cause protrusions to scratch the outer surface of respective front portion 22 and top portion covers 24.

Figures 2, 2A:
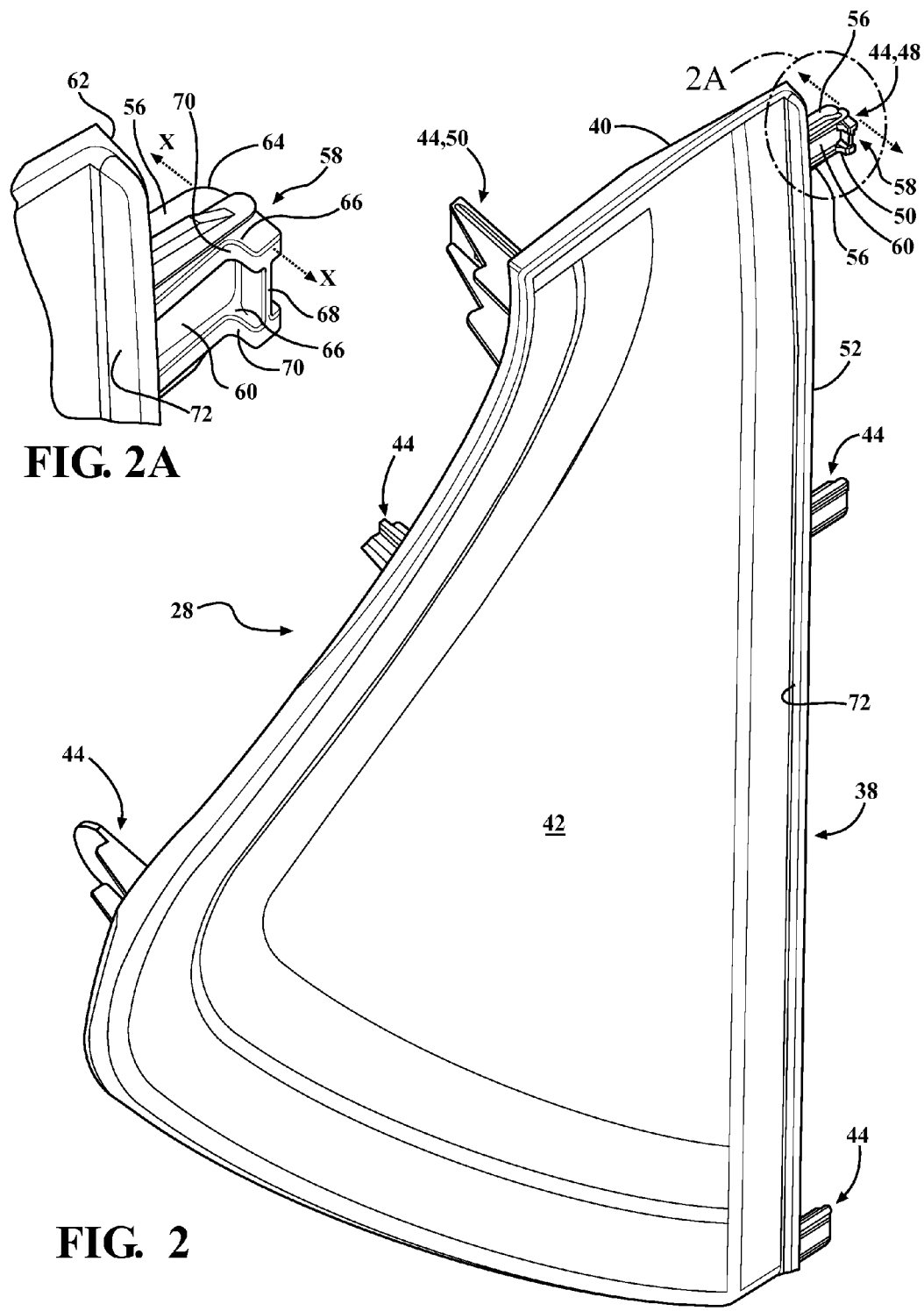
FIG. 2 is an isolated view of the side panel.
FIG. 2a is an isolated view of the first tab of FIG. 2.
Figure 3:
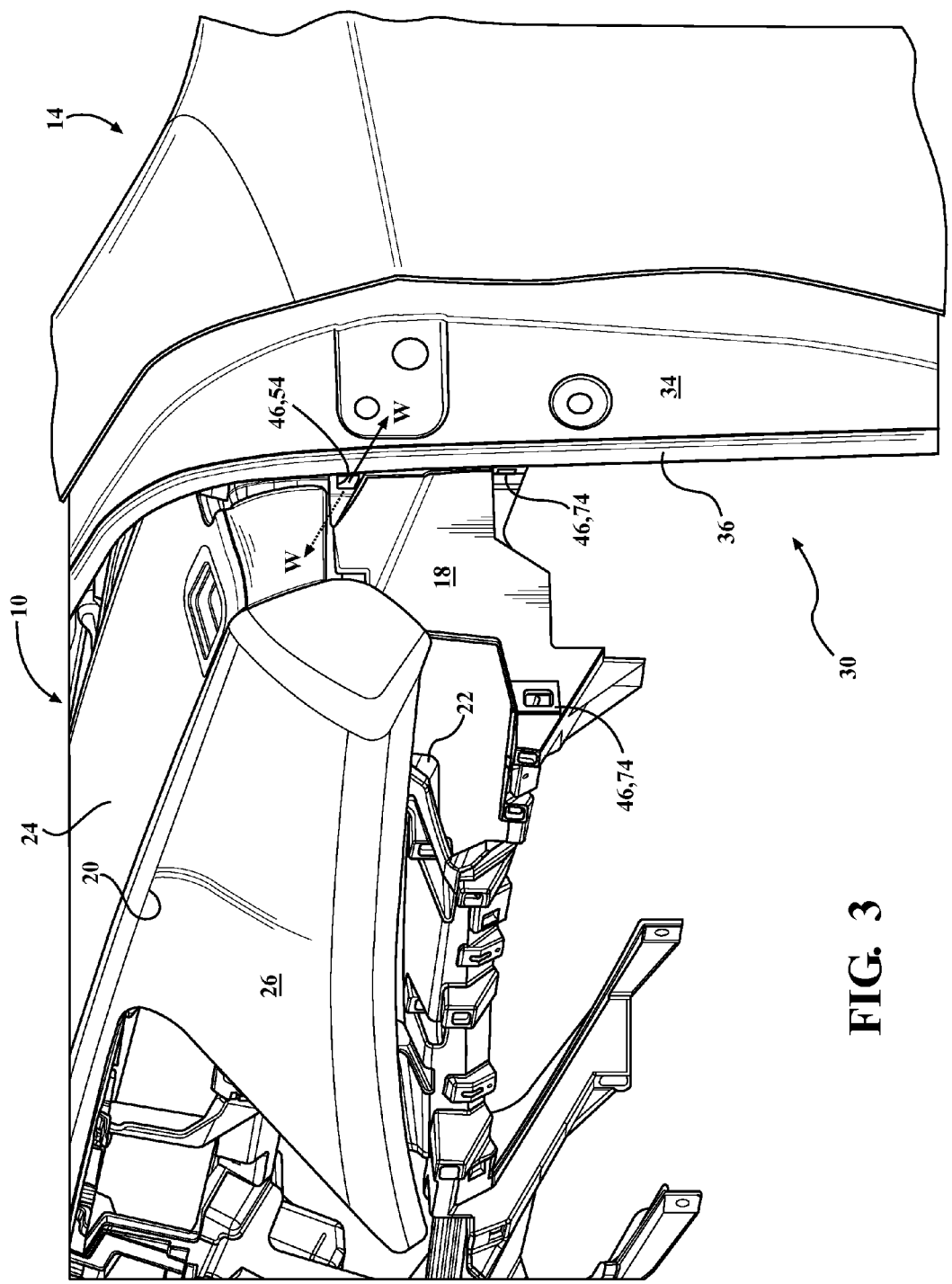
FIG. 3 is a perspective view of the base mounted to the vehicle body.
Figure 4:
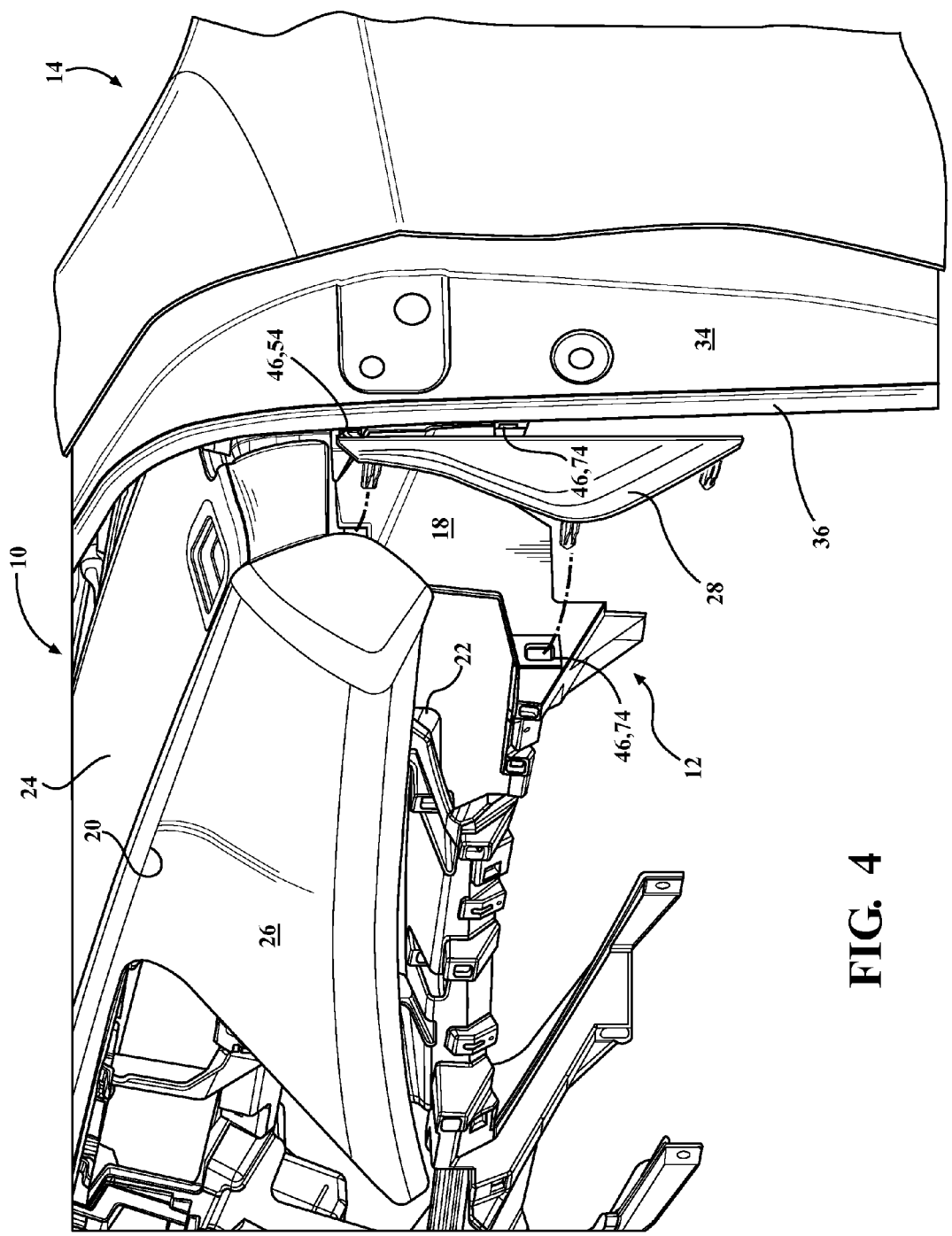
FIG. 4 is a view showing the side panel angled relative to the base prior to rotation of the side panel onto the base.

With reference now to FIG. 2, the side panel 28 includes a side panel body 38 which is generally planar. The side panel body 38 has an interior surface 40 opposite an exterior surface 42. The side panel 28 is generally dimensioned to cover the side portion 18 of the base 12. When mounted to the side portion 18, the interior surface 40 faces the side portion 18 and the exterior surface 42 faces the cabin space of the vehicle 14. The side panel 28 is configured to attach onto the side portion 18 adjacent the front portion 22 and top portion covers 24 as shown in FIG. 1.

The side panel 28 includes a plurality of tabs 44. The side portion 18 of the base 12 includes a plurality of mounting apertures 46 operable to receive each of the plurality of tabs 44 so as to fixedly attach the side panel 28 to the side portion 18. In particular, the side panel 28 includes a first tab 48 spaced apart a second tab 50. The first tab 48 extends axially from a side edge 52 of the side panel 28 so as to extend away from the side panel body 38. A second tab 50 extends away from the interior surface 40 of the side panel 28.

The first tab 48 is configured to fit within a first mounting aperture 54. The first mounting aperture 54 is disposed on a side flange 56 of the base 12. The side flange 56 extends generally orthogonal to the side portion 18 of the base 12. The side flange 56 includes a generally planar surface configured to abut flushingly against the vehicle body 30. The first mounting aperture 54 has a width as defined be axis W show in FIG. 3.

The first tab 48 is configured to require the side panel 28 to be inserted at an angle with respect to the side portion 18. The first tab 48 may include a first flange 58 disposed on the exterior surface 42 extending opposite the second tab 50. The first flange 58 has a length greater in distance than the predetermined width of the first mounting aperture 54 so as to require the side panel 28 to be angled relative to the base 12 when mounting the side panel 28 to the side portion 18 thus preventing the other tabs 44 from scratching the exterior surface 42 of the front or top cover portion. Specifically, the side panel 28 is angled so as to fit the first flange 58 into the first mounting aperture 54, once the first flange 58 is through the first mounting aperture 54, the side panel 28 is then rotated.

The remaining tabs 44 travel along a fixed radius about the rotation point, specifically the first mounting aperture 54. The remaining mounts of the side portion 18 are configured to receive a corresponding tab 44 along the radius of rotation so as to prevent the tabs 44 from engaging an exterior surface 42 of respective top and front portion covers 24, 26.

With reference again to FIG. 2, a perspective view of an embodiment of the side panel 28 is provided. The side panel 28 may be formed of a generally resilient material such as plastic and may include a skin formed of synthetic leather for aesthetic purposes which is not shown.

The first tab 48 includes an elongated body 60 having a pair of side flanges 56. Each of the side flanges 56 is spaced apart from the other. The side flanges 56 are generally planar with respect to the interior surface 40 of the side panel 28. Each of the side flanges 56 is generally narrows from a first proximal end 62 to a first distal end 64 and is dimensioned so as to place the first proximal end 62 of the elongated body 60 in a pinching engagement with the first mounting aperture 54.

The first flange 58 has a length which is defined by a distance measured along the axis labeled X. The first mounting aperture 54 has a predetermined width which is measured along the axis which generally extends the width of the vehicle and is labeled W as referenced in FIG. 3. The length of the first flange 58 is greater than the width of the first mounting aperture 54.

The first flange 58 may further include a pair of first side walls 66. Each of the pair of first side walls 66 is spaced apart from the other. The first side walls 66 extend between a body wall 68. The first side walls 66 are disposed on opposite edges of the first flange 58. Each of the pair of first side walls 66 has an arcuate side edge 70 which faces the side panel body 38 of the side panel 28. The arcuate side edge 70 facilitates the rotation of the side panel 28 about the first mounting aperture 54 when the first tab 48 is received within the first mounting aperture 54.

A second side wall 72 extends along the side edge 52 of the side panel 28 adjacent the first tab 48. As referenced in FIG. 5, the first side wall 66 abuts against a portion of the vehicle 14 frame defining the door opening and sits tucked underneath the weather strip 36.

The side panel 28 may include a plurality of second tabs 50 so as to fittingly engage the side panel 28 to respective side portions 18 of the base 12. Each of the second tabs 50 is disposed adjacent the peripheral edges of the side panel 28. The second tabs 50 are configured to fittingly engage respective second mounting apertures 74 disposed on the side portion 18 of the base 12. The second tabs 50 may be ramp shaped so as to facilitate the insertion of the second tabs 50 with respective second mounting apertures 74. The second tabs 50 may include side walls, each of which have a ramp shape. The proximal ends of the side walls are pressed up against the inner peripheral edges of respective second mounting apertures 74 so as to create a pinch engagement and retain the side panel 28 in a fixed relationship with respect to the side portions 18 of the base 12.

The number of second tabs 50 corresponds to an equal number of second mounting apertures 74 disposed on the side portion 18 of the base 12. The second mounting apertures 74 are disposed along the side portion 18 so as to receive a corresponding second tab 50 when the side panel 28 is rotated along a radius wherein the center point is where the first tab 48 is pivoted about the first mounting aperture 54. Thus the second tabs 50 are not positioned and moved so as to scratch the exterior surface 42 of respective front portion 22 and top portion covers 24. Thus the instrument panel assembly 10 is configured to as to prevent an installer from pushing the first tab 48 directly into the first mounting aperture 54 wherein the second tabs 50 may be brushed along the exterior surface 42 of respective top portion 20 and front portion covers 26. Specifically, the side panel 28 must be angled with respect to the side portion 18 when installing the first tab 48 into the first mounting aperture 54.

Figure 5:
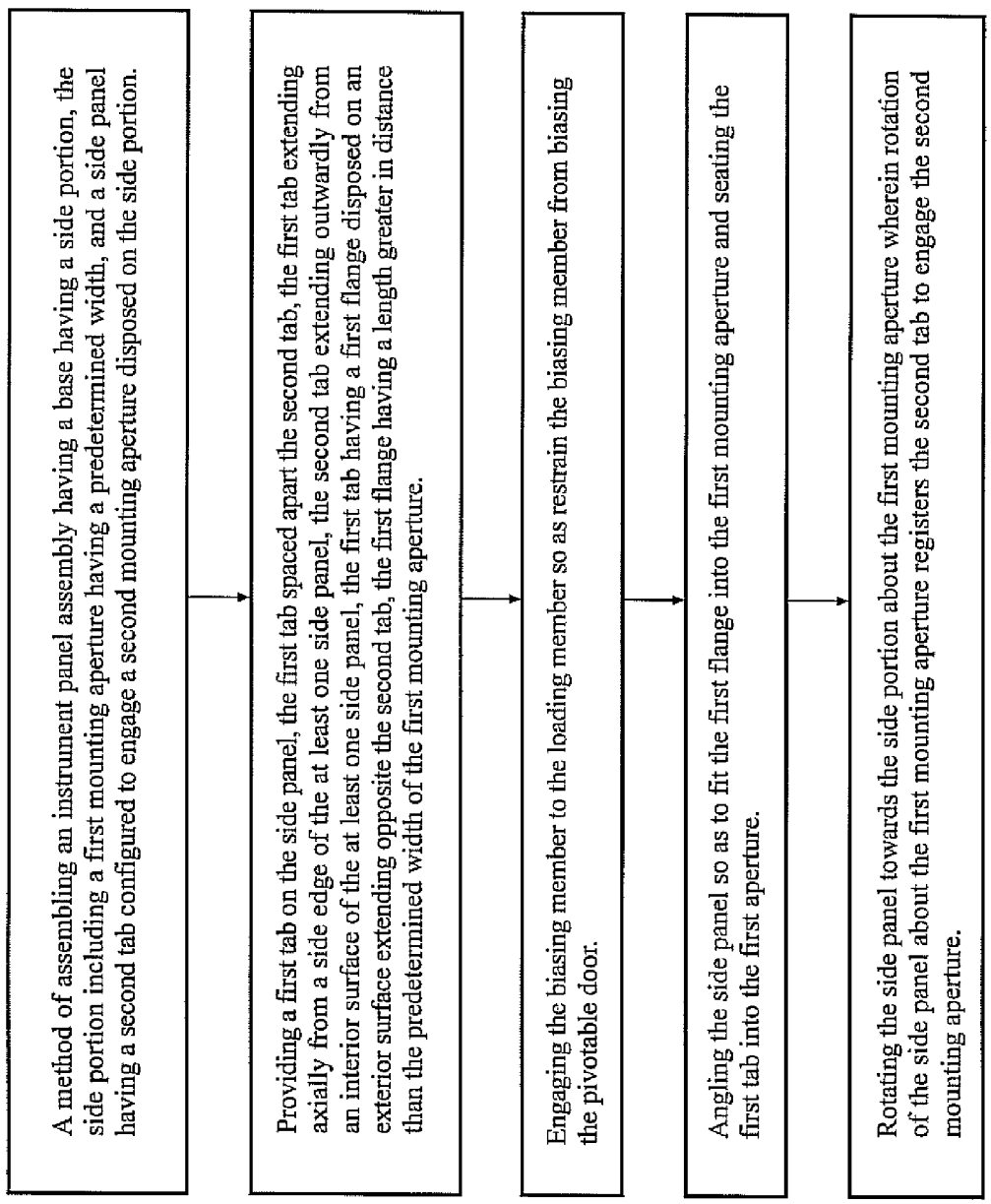
FIG. 5 is a diagram showing the steps for a method of assembling an instrument panel assembly.

With reference now to FIG. 5, a method of assembling an instrument panel assembly 10 is also provided. The instrument panel assembly 10 includes a base 12 having a top portion 20, a front portion 22. The top and front portions 20, 22 generally extend the width of the automotive vehicle 14 and may include compartments configured to receive various vehicle 14 components such as an air conditioning duct, or electrical devices and displays.

The instrument panel assembly 10 may further include a top portion cover 24, and a front portion cover 26. The front portion cover 26 and the top portion cover 24 are mounted to respective front and top portions 22, 20 of the base 12. The base 12 further includes a side portion 18 having a first mounting aperture 54. The first mounting aperture 54 is disposed on a side flange 56 of the base 12. The side flange 56 extends generally orthogonal to the side portion 18 of the base 12. The side flange 56 includes a generally planar surface configured to abut flushingly against the vehicle body 30. The first mounting aperture 54 has a width as defined be axis W show in FIG. 3.

The instrument panel assembly 10 further includes a side panel 28. The side panel 28 includes a side panel body 38 which is generally planar. The side panel body 38 has an interior surface 40 opposite an exterior surface 42. The side panel 28 is generally dimensioned to cover the side portion 18 of the base 12. When mounted to the side portion 18, the interior surface 40 faces the side portion 18 and the exterior surface 42 faces the cabin space of the vehicle 14. The side panel 28 is configured to attach onto the side portion 18 adjacent the front portion 22 and top portion covers 24. having an interior surface 40 opposite an exterior surface 42

The side panel 28 includes a first tab 48 spaced apart a second tab 50. The first tab 48 extends axially from a side edge 52 of the side panel 28 so as to extend away from the side panel body 38. A second tab 50 extends away from the interior surface 40 of the side panel 28. The first tab 48 is configured to fit within the first mounting aperture 54. The first tab 48 includes a first flange 58 disposed on the exterior surface 42 extending opposite the second tab 50. The first flange 58 has a length greater in distance than the predetermined width of the first mounting aperture 54 so as to require the side panel 28 to be angled relative to the base 12 when mounting the side panel 28 to the side portion 18 thus preventing the other tabs 44 from scratching the exterior surface 42 of the front or top cover portion.

The method includes the step of angling the side panel 28 with respect to the side portion 18 so as to fit the first flange 58 into the first mounting aperture 54 and seating the first tab 48 into the first aperture. The method proceeds to rotating the side panel 28 towards the side portion 18 about the first mounting aperture 54 so as to press the side panel 28 against the side portion 18 of the base 12.

The method may further include the step of providing a pair of first side walls 66 formed on the first flange 58. Each of the pair of first side walls 66 is spaced apart from the other and extends between a body wall 68. Each of the pair of first side walls 66 is disposed on opposite edges of the first flange 58. The first side walls 66 may include an arcuate side edge 70 facing the side panel 28 so as to form a generally ramp shaped profile.

The method proceeds to rotating the side panel 28 about the first mounting aperture 54 along the arcuate side edges 70 of respective first side walls 66. The side panel 28 may include a plurality of second tabs 50. The side portion 18 may include a corresponding number of second mounting apertures 74. The second mounting apertures 74 are disposed on the side portion 18 so as to receive a corresponding second tab 50 as the second tab 50 moves about a radius wherein the center point of the radius is where the first tab 48 is pivoted within the first mounting aperture 54.

The method may further include the step of providing a plurality of second tabs 50 on the side panel 28, and a corresponding number of second mounting apertures 74 on the side portion 18 of the base 12. Each second mounting aperture 74 is disposed on the side portion 18 so as to receive a respective second tab 50 when the side panel 28 is rotated about the first mounting aperture 54. Thus, once the first tab 48 is angled and fitted into the first mounting aperture 54, the side panel 28 is rotated about the first mounting aperture 54. The side panel 28 is thus mounted onto the side portion 18 in such a manner that the second tabs 50 do not scratch the outer surface of the front portion 22 and top portion covers 24.

Obviously, many modifications and variations of the present invention are possible in light of the above teachings and may be practiced otherwise than as specifically described while within the scope of the appended claims.

The invention claimed is:

1. An instrument panel assembly for use in a vehicle, the instrument panel assembly comprising:
   a base having a side portion, including a first mounting aperture having a predetermined width; and
   at least one side panel having an interior surface opposite an exterior surface, a first tab spaced apart a second tab, the first tab extending axially from a side edge of the at least one side panel so as to be generally coplanar with the at least one side panel, the second tab extending outwardly from the interior surface of the at least one side panel and generally orthogonal to the first tab, the first tab having a first flange disposed on the exterior surface extending in a direction opposite the second tab, the first flange is disposed on a distal end of the first tab, the first flange having a length greater in distance than the predetermined width of the first mounting aperture so as to require the at least one side panel to be angled relative to the base when mounting the at least one side panel to the side portion.

2. The instrument panel assembly as set forth in claim 1, wherein the base includes a top portion, a front portion, a top portion cover, and a front portion cover, the front portion cover mounted to the front portion and the top portion cover mounted to the top portion.

3. The instrument panel assembly as set forth in claim 2, wherein the side portion includes a second mounting aperture configured to receive the second tab, the second mounting aperture disposed opposite the first mounting aperture and adjacent the front portion cover so as to receive the second tab when the first tab is rotated about the first mounting aperture toward the front portion cover.

4. The instrument panel assembly as set forth in claim 1, wherein the first tab includes an elongated body having a pair of side flanges, each of the side flanges spaced apart from each other and generally planar with respect to the interior surface of the at least one side panel, wherein each of the pair of side flanges narrows from a proximal end to a distal end and dimensioned so as to place the proximal end of the elongated body in a pinching engagement with the first mounting aperture.

5. The instrument panel assembly as set forth in claim 1, wherein the first flange includes a pair of first side walls, each of the pair of first side walls spaced apart from each other and extending between a body wall, each of the pair of first side walls disposed on opposite edges of the first flange, each of the pair of first side walls including an arcuate side edge facing the at least one side panel, the arcuate side edge facilitating rotation of the at least one side panel about the first mounting aperture.

6. The instrument panel assembly as set forth in claim 1, further including a second side wall extending along the side edge.

7. The instrument panel assembly as set forth in claim 1, wherein the second tab is a plurality of second tabs, and the second mounting aperture is a plurality of second mounting apertures, the plurality of second mounting apertures corresponding in number to the plurality of second tabs.

8. The instrument panel assembly as set forth in claim 7, wherein each of the plurality of second mounting apertures is disposed on the side portion so as to receive a corresponding plurality of second tabs as each of the plurality of second tabs are moved along a radius wherein a center point of the radius is where the first tab is pivoted within the first mounting aperture.

9. A method of assembling an instrument panel assembly, the instrument panel assembly having a base having a side portion, the side portion including a first mounting aperture having a predetermined width, and at least one side panel having a second tab configured to engage a second mounting aperture disposed on the side portion, the method comprising the steps of:

providing a first tab on the at least one side panel, the first tab spaced apart the second tab, the first tab extending axially from a side edge of the at least one side panel so as to be generally coplanar with the at least one side panel, the second tab extending outwardly from an interior surface of the at least one side panel and generally orthogonal to the first tab, the first tab having a first flange disposed on an exterior surface extending in a direction opposite the second tab, the first flange disposed on a distal end of the first tab, the first flange having a length greater in distance than the predetermined width of the first mounting aperture;

angling the at least one side panel so as to fit the first flange into the first mounting aperture and seating the first tab into the first mounting aperture; and rotating the at least one side panel towards the side portion about the first mounting aperture wherein rotation of the at least one side panel about the first mounting aperture registers the second tab to engage the second mounting aperture.

10. The method of assembling an instrument panel as set forth in claim 9, further including the step of providing a pair of first side walls formed on the first flange, each of the pair of first side walls spaced apart from each other and extending between a body wall, each of the pair of first side walls disposed on opposite edges of the first flange, each of the pair of first side walls including an arcuate side edge facing the at least one side panel, and rotating the at least one side panel about the first mounting aperture along the arcuate side edge.

11. The method of assembling an instrument panel as set forth in claim 10, wherein the base further includes a top portion, a front portion, a top portion cover, and a front portion cover, the front portion cover mounted to the front portion and the top portion cover mounted to the top portion.

12. The method of assembling an instrument panel as set forth in claim 11, wherein the side portion includes the second mounting aperture configured to receive the second tab, the second mounting aperture disposed opposite the first mounting aperture and adjacent the front portion cover so as receive the second tab when the first tab is rotated about the first mounting aperture toward the front portion cover.

13. The method of assembling an instrument panel as set forth in claim 12, wherein the second tab is a plurality of second tabs, and the second mounting aperture is a plurality of second mounting apertures, the plurality of second mounting apertures corresponding in number to the plurality of second tabs.

14. The method of assembling an instrument panel as set forth in claim 13, wherein each of the plurality of second mounting apertures is disposed on the side portion so as to receive a corresponding plurality of second tabs as each of the plurality of second tabs are moved along a radius wherein a center point of the radius is where the first tab is pivoted within the first mounting aperture.

* * * * *